US005997597A

United States Patent [19]

Hagan

[11] Patent Number: 5,997,597

[45] Date of Patent: Dec. 7, 1999

[54] ABRASIVE TOOL WITH KNURLED SURFACE

[75] Inventor: John Hagan, Shrewsbury, Mass.

[73] Assignee: Norton Company, Worcester, Mass.

[21] Appl. No.: 09/028,405

[22] Filed: Feb. 24, 1998

[51] Int. Cl.[6] .............................. B23F 21/03; B24D 3/00; B24D 18/00

[52] U.S. Cl. ................................ 51/309; 51/295; 51/307; 451/547; 451/527

[58] Field of Search ............................ 51/295, 309, 307; 451/527, 547, 553

[56] References Cited

U.S. PATENT DOCUMENTS

| | | | |
|---|---|---|---|
| 2,049,874 | 8/1936 | Sherk | 51/206 |
| 2,755,601 | 7/1956 | Lux | 51/72 |
| 2,810,190 | 10/1957 | Schmidgall | 29/103 |
| 3,436,871 | 4/1969 | Schneider et al. | 51/204 |
| 3,495,359 | 2/1970 | Smith et al. | 51/204 |
| 3,863,401 | 2/1975 | Schwarzkopf et al. | 51/206.4 |
| 3,894,673 | 7/1975 | Lowder et al. | 51/309 |
| 4,037,367 | 7/1977 | Kruse | 51/209 |
| 4,114,322 | 9/1978 | Greenspan | 51/206 |
| 4,275,528 | 6/1981 | Higginbotham | 51/206 |
| 4,461,268 | 7/1984 | Inoue | 125/15 |
| 4,591,363 | 5/1986 | Silverman | 51/295 |
| 4,624,237 | 11/1986 | Inoue | 125/15 |
| 4,882,878 | 11/1989 | Benner | 51/206 |
| 4,908,046 | 3/1990 | Wiand | 51/293 |
| 4,968,326 | 11/1990 | Wiand | 51/293 |
| 5,018,276 | 5/1991 | Asada | 30/347 |
| 5,062,865 | 11/1991 | Chen et al. | 51/295 |
| 5,102,621 | 4/1992 | Sara | 420/470 |
| 5,492,771 | 2/1996 | Lowder et al. | 428/565 |
| 5,523,158 | 6/1996 | Kapoor et al. | 51/295 |
| 5,669,943 | 9/1997 | Horton et al. | 51/307 |

FOREIGN PATENT DOCUMENTS

| | | | |
|---|---|---|---|
| 090274 | 10/1983 | European Pat. Off. | B24D 7/00 |
| 393540 | 10/1990 | European Pat. Off. | C25D 5/02 |
| 530536 | 3/1993 | European Pat. Off. | B24D 7/06 |
| 770457 | 5/1997 | European Pat. Off. | B24D 3/34 |
| 63385 | 1/1892 | Germany | B23D 67/72 |
| 3530974 | 3/1987 | Germany | B24B 9/14 |
| 02081538 | 3/1990 | Japan | B24D 3/00 |
| 06124106 | 6/1994 | Japan | B24D 5/06 |
| 2154917 | 9/1985 | United Kingdom | B24D 7/02 |
| 97/33714 | 9/1997 | WIPO | B23D 61/18 |

*Primary Examiner*—Michael Marcheschi
*Attorney, Agent, or Firm*—Sampson & Associates; Mary E. Porter

[57] ABSTRACT

An abrasive tool includes a steel core having at least one cutting face which is knurled to provide a uniform texture of recesses of predetermined size. A single layer of abrasive grain such as diamond, synthetic diamond, and/or cubic boron nitride having a grit size which is less than the predetermined size of the recesses is brazed onto the cutting face so that the single layer of abrasive grain follows the texture of the cutting face to facilitate coolant and swarf transport for improved tool life, power consumption and workpiece surface finish.

23 Claims, 3 Drawing Sheets

ABRASIVE TOOL WITH KNURLED SURFACE

BACKGROUND OF THE INVENTION

1. Field of the Invention

This invention relates to abrasive tools, and more particularly to grinding wheels having a single layer of abrasive bonded to a textured cutting face.

2. Background Information

Single layer metal bonded abrasives are used to form the cutting surfaces of various cutting tools such as core drill bits, diamond saw blades and single abrasive layer grinding wheels. These cutting tools are useful for cutting and abrading relatively hard materials such as metal, concrete, stone, ceramics and the like, as well as for drilling subterranean formations in oil and gas recovery. Such cutting tools are normally constructed from a core or blade support material such as steel or aluminum and a superabrasive such as diamond or cubic boron nitride (CBN) bonded to a cutting face of the core.

While effective in many of these applications, single layer bonded abrasive tools have not been particularly effective in some relatively difficult, precision grinding operations. An example of such a precision grinding application includes aerospace creepfeed grinding where thermal damage to the workpiece is problematic. Another example is bi-metallic engine block deck face grinding, in which blocks consisting of dissimilar metals such as cast iron with aluminum inserts, must be ground to precision tolerances. In this application, burr formation at the interface of the dissimilar metals is particularly troublesome. In both of these applications, it is difficult to apply coolant to, and remove the grinding swarf from, the grinding zone or point of contact between the wheel and workpiece.

One attempt to prevent chips from clogging the abrasive grain is disclosed in European patent application No. EP 0770457 A1. This reference discloses a grinding wheel having a number of pyramidal or truncated-pyramidal projections formed on a portion of a metal base. Super abrasive grains having grain sizes which are smaller than the heights of the projections are fixed to the surfaces of the projections. A coating film consisting of fluororesin is formed to at least partially cover the outer surface of the grinding face including the surfaces of the super abrasive grains, for "preventing deposition of a workpiece." The grains are bonded to the grinding face by electrodeposition or electroplating. While this construction may provide advantages in terms of chip removal in some applications, the use of the fluororesin layer adds complexity and cost to the manufacture of the grinding wheel. Moreover, electrodeposited bonds, although historically considered to be optimal for heavy duty use, have generally proven undesirable for use wheels adapted for precision grinding, particularly those which employ textured cutting faces. In part, this is because the bond has insufficient strength to resist the pressures of such applications, so that the abrasive grain and bond tend to break free or peel from the cutting face prematurely. This breaking or peeling tends to reduce tool life while the loose abrasive also tends to score the workpiece, thus degrading the quality of the surface finish. This phenomenon is particularly problematic in textured cutting faces as grinding contact is made with a relatively small number of grains (those on the apex of the projections), which accordingly experience relatively high grinding forces per unit area of contact.

One explanation for this relatively weak bond is that electrodeposited bonds serve only to mechanically entrap the individual abrasive grains and do not form a chemical bond with the grain.

Another disadvantage of this approach is that electrodeposition tends to attenuate the texture of a cutting face by permitting the grain to gather or collect in the recesses between projections. An example of this attenuation or collection of grains is shown in EP 0393540B1. One approach to address this problem would be to provide a greater degree of texture to the core supporting the abrasive, such as by milling a series of relatively deep grooves in the cutting face, to compensate for the attenuation. However, conventional milling operations tend to be time consuming and thus relatively expensive.

Brazed bonds are an alternative to electrodeposition and offer the potential advantage of improved bond strength. Historically, however, due to manufacturing concerns, brazed bonds have been selected less frequently than electroplated bonds for use in single layer superabrasive tools. Tools made using soft brazes have been typically directed to less demanding non-abrasive tool applications. Use of harder brazes has been discouraged because diamond and CBN abrasives tend to thermally degrade due to oxidation at the higher melting temperatures associated with these brazes. Moreover, the harder bonds provided by some brazed bonds such as molybdenum/iron alloys disclosed in U.S. Pat. No. 3,894,673 tend to have a significantly different coefficient of thermal expansion than the diamond abrasive, which introduces certain stresses to the diamond crystals which are not relieved to the same extent as in softer, lower melting point brazes, thus tending to reduce tool life.

One example of a highly textured or contoured tool which utilizes a braze bond has been disclosed in commonly assigned International Publication No. WO 97/33714. This disclosure, however, is directed to cutting tools, namely saw blades, rather than to grinding wheels, and utilizes a substrate having a plurality of relatively large teeth coated with abrasive grain. These teeth-like geometric shapes must be milled into the core prior to brazing the abrasive onto the core, necessitating an expensive milling step, or other similar manufacturing step, to produce a profiled core for the tool.

A need thus exists for an improved grinding wheel having a single layer of abrasive grain and a textured cutting surface manufactured without expensive or difficult processes, which is adapted for use in heavy duty precision grinding applications.

SUMMARY OF THE INVENTION

According to an embodiment of this invention, an abrasive tool comprises a core having at least one cutting face, the at least one cutting face being knurled to provide a uniform texture of projections having uniform height. A single layer of abrasive grain is disposed on the at least one cutting face, the abrasive grain having grain sizes smaller than the uniform height. A metal bond is brazed to the cutting face and the abrasive grain to secure the abrasive grain to the cutting face so that the grain conforms to the uniform texture.

The present invention provides, in a second aspect, a method of fabricating an abrasive tool comprising the steps of:

(a) providing a core having at least one cutting face;

(b) knurling the at least one cutting face to provide a uniform texture of projections having uniform height;

(c) providing a single layer of abrasive grain having grain sizes smaller than the uniform height; and (d) brazing the single layer of abrasive grain onto the at least one cutting face at about 600–800° C. in a non-oxidizing atmosphere.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
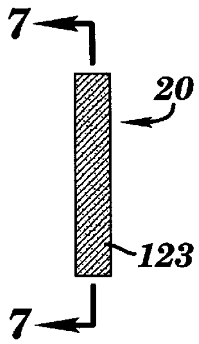
FIG. 1 is a side elevational view of an embodiment of an abrasive tool of the present invention.

Referring to the figures set forth in the accompanying Drawings, the illustrative embodiments of the present invention will be described in detail hereinbelow. Like features shown in the accompanying Drawings shall be indicated with like reference numerals and similar features as shown in alternate embodiments in the Drawings shall be indicated with similar reference numerals.

Briefly described, the present invention is a brazed single layer abrasive grinding wheel 20 (e.g. FIGS. 1 & 2) including a metallic core 22 (FIG. 7) having a cutting face 23 which is knurled to provide a uniform texture of projections 24 (FIG. 7) of uniform height h. A single layer of abrasive grain 26 having grain sizes smaller than the uniform height is brazed onto the knurled cutting face 23. The single layer of abrasive grain 26 thus follows the contour of cutting face 23 so that recesses 28 formed between the projections 24 facilitate swarf removal, while the braze provides improved bond strength relative to prior art electroplated bonds. Knurling is utilized to provide the uniform array of projections substantially more efficiently than prior art milling techniques.

Figure 2:
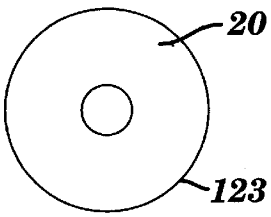
FIG. 2 is a plan view of the abrasive tool of FIG. 1.

Referring now to the drawings in detail, as shown in FIGS. 1 & 2, a grinding wheel 20 of the present invention may include a conventional ANSI (American National Standards Institute) Type 1 wheel, which includes a cylindrical cutting face 123. As shown in FIG. 1, cutting face 123 is provided with a slotted knurl pattern.

Figure 3:
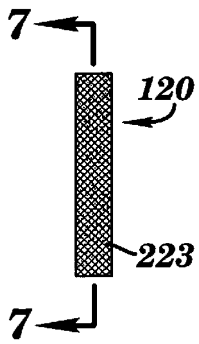
FIG. 3 is a schematic view similar to that of FIG. 1, of an alternate embodiment of an abrasive tool of the present invention.
Figure 4:
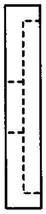
FIG. 4 is a side elevational view of another embodiment of an abrasive tool of the present invention.
Figure 5:
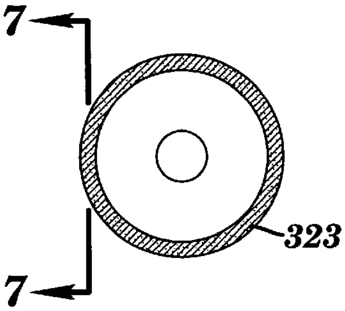
FIG. 5 is a plan view of the abrasive tool of FIG. 4.
Figure 6:
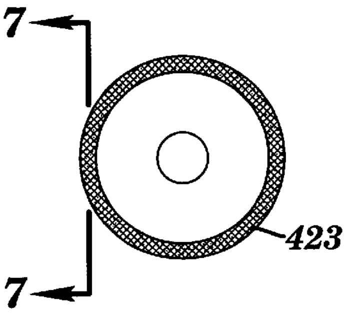
FIG. 6 is a schematic view similar to that of FIG. 5, of another embodiment of the present invention.

Alternate embodiments, such as shown in FIG. 3, include a Type 1 wheel 120 provided with a cross hatched knurl pattern on its face 223. The present invention may also be utilized on grinding wheels having non-cylindrical cutting faces. For example, as shown in FIGS. 4–6, the present invention also may be utilized on cup (ANSI Type 6) grinding wheels having annular grinding faces 323 and 423 provided with slotted and cross-hatched knurl patterns, respectively.

Figure 7:
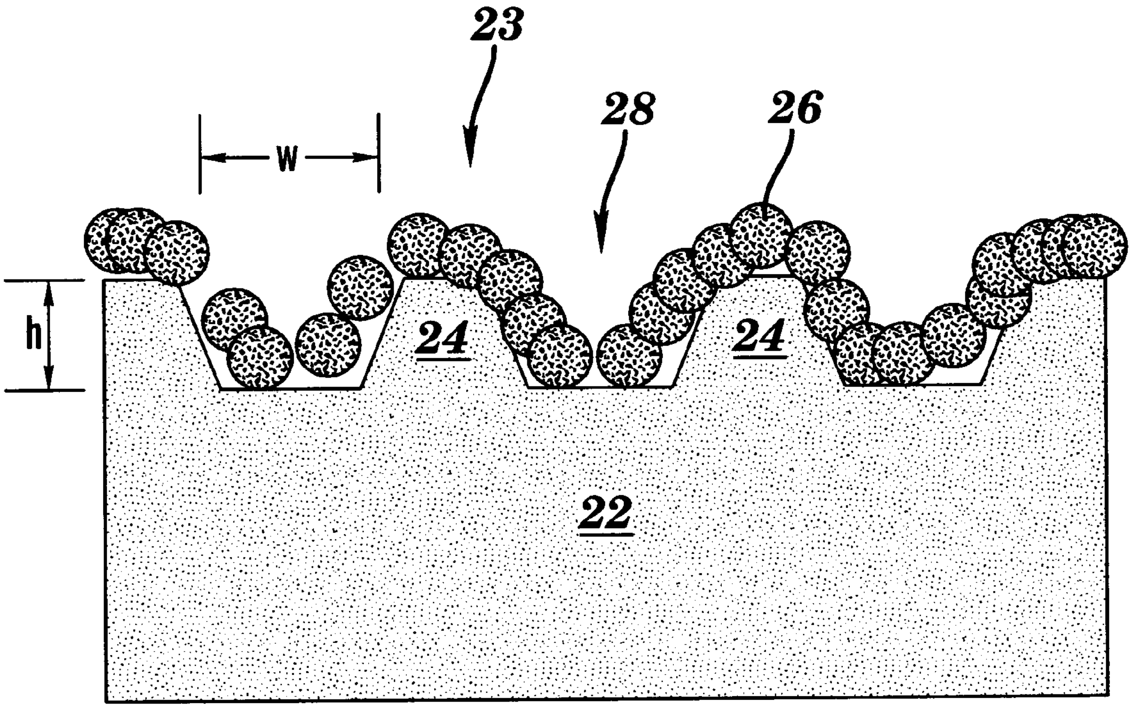
FIG. 7 is a schematic cross-section of the present invention taken along 7—7 of FIGS. 1, 3, 5 and 6.
Figure 8:
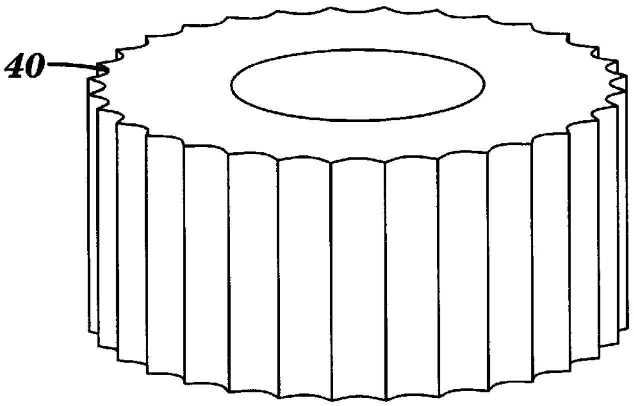
FIGS. 8–10 are perspective views of knurling tools capable of being used to fabricate the abrasive tool of the present invention.
Figure 9:
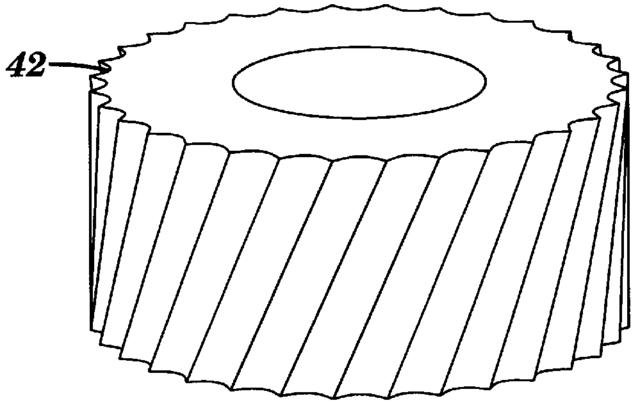
Figure 10:
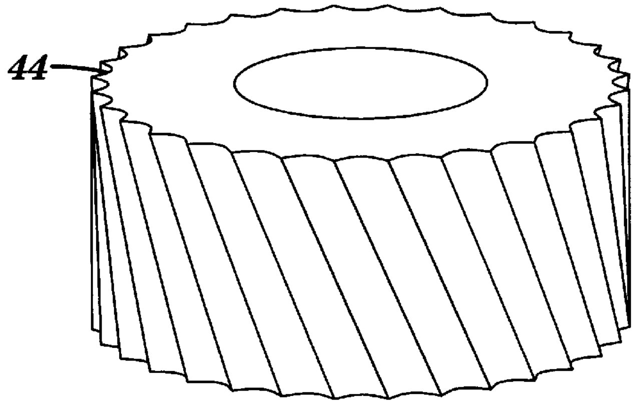

Turning now to FIG. 7, a cross-section of the grinding wheels of FIGS. 1–6 reveals metallic core 22 having a cutting face 23 which is knurled to provide a uniform texture of projections 24 of uniform height h and nominal width w. A single layer of abrasive grain 26 is brazed onto the knurled cutting face 23. The abrasive grain is preferably a superabrasive such as diamond, cubic boron nitride (CBN) or other similar, relatively hard abrasive material. Grain 26 may be of substantially any size or shape, however it will preferably be smaller than the size of projections 24. For example, a recess 28 between projections 24 having a nominal height h and width w, (FIG. 7) each of approximately 0.030 inches (0.08 cm) may be used for an abrasive size (diameter) of nominally 0.010 inches (0.025 cm). Additional examples include abrasive grain of about 600 to 850 microns particle size, or more particularly, about 825 microns (i.e. grades of abrasives containing a majority of 20/30 mesh grit size) on recesses 28 of approximately 1.5 mm; abrasive grain of about 80/100 mesh grit size on recesses 28 of approximately 0.80 mm; and grain of about 40/50 mesh grit size on recesses 28 of approximately 1.0 mm.

The braze bond used to braze the abrasive grain 26 to the cutting face 23 may be selected from any metal braze material known in the art, such as copper, copper alloys, silver alloys, nickel alloys and aluminum alloys. Examples include a conventional bronze braze of about 20–30 weight percent tin and 70–80 weight percent copper; a copper/silver alloy of about 25–30 weight percent copper and about 70–75 weight percent silver; and a nickel alloy such as Ni/Cr having about 80–85 weight percent nickel, 5–10 weight percent chromium and 5–15 weight percent of additional elements such as boron, silicon and iron. A particular example of a Ni/Cr alloy includes about 83 weight percent nickel, 7 weight percent chromium, 3.1 weight percent boron, 4.5 weight percent silicon and 3.0 weight percent iron. A particular example of a copper/silver alloy includes about 28 weight percent copper and about 72 weight percent silver.

Reactive brazes (also referred to as "active brazes") including a relatively soft alloy such as bronze or copper/silver, with an active metal such as titanium, zirconium and/or indium may also be utilized. An example of such a reactive braze includes the above-referenced copper/silver alloy of about 25–30 weight percent copper and about 70–75 weight percent silver, with about 4–6 weight percent titanium. Brazes having such active metals tend to readily wet superabrasive particles such as diamond, to promote chemical, as well as mechanical bonding of the abrasive grain to the metallic core. In particular, these active metals form a nitride chemical linkage with CBN grain, while they form a carbide chemical bond with diamond grain. These brazes are preferably applied in a non-oxidizing atmosphere, such as a vacuum, or inert atmosphere such as argon or helium, to help prevent metal oxidation and degradation of the abrasive at the braze melting temperatures.

The combination of mechanical and chemical bonding provided by the braze has been shown to provide superior bonding of the abrasive relative to electroplating. Another advantage of these brazed bonds is that the individual abrasive grains are not drawn into physical contact with the metal cutting face. This feature enables the abrasive grain to "float" on the braze during fabrication to provide a continuous bond of relatively greater surface area between the grain and cutting face of the core than the bond typically provided by electroplating as discussed hereinabove. A further advantage associated with this improved bond surface area is the ability to braze abrasive of larger grit size to the cutting face. This permits manufacture of tools having a longer life, as will be discussed hereinbelow.

Moreover, use of an abrasive grain sized smaller than recesses 28, and the use of a braze bond, enables the layer of abrasive grain 26 to conform to the shape of the knurled cutting face 23. Such conformity is particularly enhanced by the braze which promotes application of a generally uniform layer of grain 26 as shown. Thus, in addition to the advantages discussed hereinabove, the use of the braze bond substantially overcomes the drawback associated with electroplated grain, namely, the tendency of electroplated grain to attenuate the texture of a cutting face by gathering in the recesses between projections.

In this manner, recesses 28 are formed between the abrasive-coated projections 24 to facilitate supply of grinding coolant to the grind zone, and removal of chips or grinding swarf therefrom. This swarf removal and coolant flow may be further enhanced by use of straight or diagonal knurl patterns as discussed hereinbelow. Advantageously, such increased swarf removal and coolant flow tends to relatively reduce burr formation on the edge of a workpiece, reduce any tendency to thermally damage (i.e. burn) the workpiece, reduce power consumption due to increased lubricity, and enable higher material removal rates for faster grinding, as will be discussed in greater detail hereinbelow.

Figure 11:
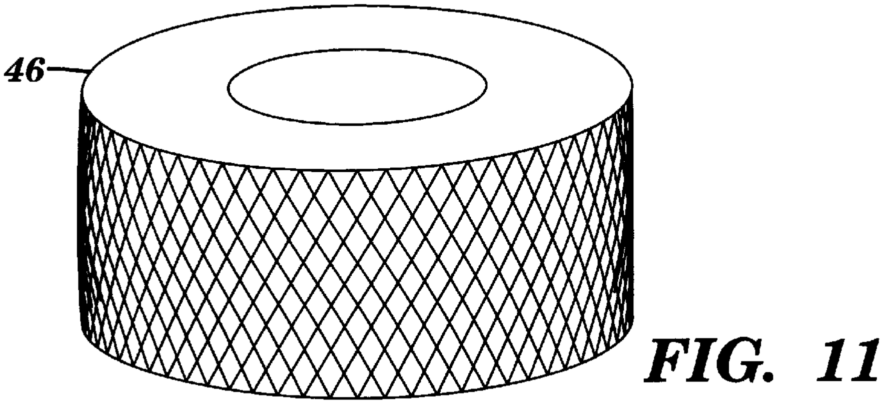
FIG. 11 is a schematic perspective view of a diamond patterned knurling tool capable of being used to fabricate the abrasive tool of the present invention.

Turning to FIGS. 8–11, projections 24 are formed using conventional knurls or knurling tools of various configuration, such as those having a straight groove 40 (FIG. 8), right hand groove 42 (FIG. 9), left hand groove 44 (FIG. 10) and a diamond or cross-hatched knurl pattern 46 (FIG. 11). These knurls are utilized in a conventional manner to press the inverse of the knurl pattern into the face 23 of core 22 of the grinding wheel prior to application of the abrasive grain 26. For example, knurling tools are typically used on a lathe and the pattern is formed by pushing the tool into cutting face 23. The knurl displaces the material into the inverse shape of the knurl. Depending on the pattern required, a single knurl or a pair of knurls may be used.

Providing the textured pattern to face 23 in this manner is substantially simpler, faster and less expensive than providing a similar pattern utilizing conventional milling operations. This knurling process becomes increasingly advantageous as the size and distance between the recesses or grooves decreases, to enable relatively small, closely packed recesses or grooves to be applied in a quick, cost effective manner.

The abrasive grain 26 is applied once core 22 has been provided with the desired array of projections 24. This process is generally accomplished by coating the cutting face 23 with a braze paste comprising braze alloy precursors and an organic binder. Braze metal alloy precursors are elemental or prealloyed metal powders or metal bearing compounds which are, in the course of heat treatment (brazing) reduced to a metal. As discussed hereinabove, preferred metal alloy compositions comprise an active component capable of chemically reacting with the abrasive grit.

The next step is to sprinkle an abrasive grit of selected type and size, in desired concentration onto the braze paste. The core 22 is then dried and heat treated within a temperature range of approximately 25–900° C., (600–900° C. in one embodiment) in an inert atmosphere or a vacuum, to first remove the organic binder at lower temperatures and then braze at temperature sufficient to melt the metal braze precursor components and attach abrasive grit to the cutting face 23.

The following illustrative examples are intended to demonstrate certain aspects of the present invention. Both of the wheels in the Examples are Type 6, cup shaped wheels of the type shown in FIGS. 4–6, with an 11.75 in (29.8 cm) outer diameter and 0.25 in (0.6 cm). They are knurled using a knurling tool purchased from MSC Industrial Supply Co. of Woburn Mass., of the type shown FIG. 11, known as a male 30° diamond, with 90° tooth angle and 16 teeth per inch. They are tested by grinding a 7 inch (18 cm) aluminum/cast iron bimetallic engine block. These tests are summarized in Table 1.

Due to the limitations of the electroplated control wheels, diamond grit size selected for this test is only approximately 400 microns. Because the diamond bond in the brazed tool is more tenacious, larger diamond grit may be used and even longer relative wheel life will be achieved.

TABLE 1

| Wheel Samples | Power (at maximum) | Maximum MRR (in$^3$/min) | Feed Rate (in/min) | Wheel Life* | Depth of Cut per Pass | Surface Finish ($R_a$ $\mu$m) |
|---|---|---|---|---|---|---|
| Control - 1 | 7.0 hp | 2.5 | 70 | 1 | .014 in | 15 |
| Example - 1 | 6.0 hp | 2.5 | 70 | 1.1–2 times | .014 in | 10 |

*Wheel life is measured in number of blocks ground, expressed as a multiple of the wheel life of Control-1.

Grinding Conditions

Okuma Machining Center (10 HP), with vertical spindle, CNC controlled
External coolant pump (20 psi)
Master Chemical E210 water soluble coolant at 10% in water, 30 gal/min.
Wheel Speed - 3,000 rpm
Workpiece feed rate and depth of cut - See Table 1
Wheel rims are 0.25 inch wide, 11 3/4 inch diameter.

As shown, Example-1 of the present invention provides substantially improved wheel life relative to control wheel Control-1. The flatness and surface finish achieved with the wheel of the invention is superior to that possible in a milling operation or with electroplated wheels over tool life. At material removal rates over about 3 in$^3$/min, surface finish begins to degrade and power draw begins to decrease. At rates below about 3 in$^3$/min, the brazed single layer diamond tool (Example-1) gives the best surface results (the diamond cuts freely relative to electroplated diamond, and there is no discernible grain loss to scratch the surface).

The tests indicate that the wheel life of the present invention exceeds the life of the electroplated control wheel by 1.1 to 2 times. This is due to several factors. One factor is the increased abrasive holding strength provided by the active braze bond. This further reduces the abrasives lost due to high force per abrasive grain seen when using a textured cutting face, as discussed above. Another factor is the additional abrasive clearance provided by the combination of the braze bond and textured cutting face. Such clearance facilitates both greater coolant flow for greater lubricity, and chip removal for reduced chip/abrasive interaction and accordingly, reduced abrasive wear.

The present invention also enables lower spindle power and generates lower forces during grinding. This is due, in part, to the aforementioned increased lubricity. The improved chip removal also contributes to this advantage due to reduced chip/bond, chip/workpiece, and chip/abrasive interaction.

Part quality is also enhanced by the present invention. Surface finish, flatness and waviness is improved due to the aforementioned lubricity, power and force advantages. Moreover, the additional bond strength aids in reducing the release of abrasive during grinding, while any grain that does break free is removed more quickly due to the increased clearance, for reduced chip/workpiece interactions. Finish is thus improved, while burr formation and workpiece burning is reduced.

A still further aspect contributing to the aforementioned advantages of wheel life, power consumption and surface finish, relates to concentration of abrasive grain. As discussed above, electroplated wheels have relatively high grain concentration. This is due to the limitations of the electroplating process as discussed above, including the tendency of the grains to bunch or collect. Also, electroplating is most successful bonding relatively small abrasive grains, thus generally requiring a greater concentration of grains to coat a cutting face.

High concentrations in general result in a high rate of increase in required spindle power, and shorter wheel life. On a textured wheel, as wear proceeds, larger and larger numbers of abrasives are exposed and brought into contact with the work piece, thereby increasing the required spindle power. The load per grit however decreases and limits the penetration and grinding ability of the abrasive until the number of exposed abrasives is too high and the wheel stops grinding. The brazing process of the present invention advantageously lowers grain concentration relative to electroplated wheels by enabling increased grain size and more uniform grain application.

It is to be understood that these examples should not be construed as limiting.

Control-1 Wheel

Control wheel—An electroplated grinding wheel is manufactured by knurling the cutting face of a metallic core to provide slot shaped recesses approximately 0.65 mm wide and 0.65 mm deep. The cutting face is then placed in a bed of abrasive in a Nickel plating solution. Electric current is applied to deposit nickel onto the cutting face. The nickel entraps and mechanically holds abrasive grains present at the surface of the cutting face. Since the cutting face is surrounded by abrasive, the concentration of entrapped abrasive is high.

Example-1

Invention wheel—This wheel of the present invention is fabricated by knurling a cutting face of a steel core to provide slot shaped recesses approximately 0.65 mm wide and 0.65 mm deep. The cutting face is coated with a braze paste comprising 75% by weight metal braze precursors and 25% by weight organic binder, sprinkling the surface of the wet braze with synthetic diamond and drying the cutting face. Metal braze is composed of 70.6% Cu, 21.1% Sn, 8.3% $TiH_2$ by weight. The core is then placed in a furnace chamber which is evacuated to $3\times10^{-5}$ Torr and temperature raised to 500° C. to remove the organic binder and decompose $TiH_2$. The temperature is then raised to 865° C. and held there for 30 minutes to melt and react the braze components and then lowered to room temperature.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. An abrasive tool comprising:

a core having at least one cutting face;

said at least one cutting face being knurled to provide a uniform texture of projections having uniform height;

a single layer of abrasive grain disposed on said at least one cutting face;

said single layer of abrasive grain having grain sizes smaller than said uniform height; and a metal bond brazed to said cutting face and said abrasive grain to secure said abrasive grain to said cutting face.

2. The abrasive tool as set forth in claim 1, wherein said single layer of abrasive comprises diamond, synthetic diamond, cubic boron nitride or mixtures thereof.

3. The abrasive tool as set forth in claim 1, wherein said core is steel.

4. The abrasive tool as set forth in claim 1, wherein said uniform texture of projections comprise a plurality of parallel grooves.

5. The abrasive tool as set forth in claim 1, wherein said uniform texture of projections comprise a plurality of cross-hatched grooves.

6. The abrasive tool as set forth in claim 1, wherein said uniform texture of projections define an array of recesses, wherein said recesses have a larger size than a grit size of said grain.

7. The abrasive tool as set forth in claim 6, wherein said grit size is within a range of approximately 50–1000 microns.

8. The abrasive tool as set forth in claim 6, wherein said recesses have a height being greater than said grit size.

9. The abrasive tool as set forth in claim 6, wherein said recesses have a nominal width being greater than said grit size.

10. The abrasive tool as set forth in claim 1, wherein said metal bond comprises a braze selected from the group consisting of copper, a copper alloy, a nickel alloy, a silver alloy, an aluminum alloy, and combinations thereof.

11. The abrasive tool as set forth in claim 10, wherein said copper alloy comprises an alloy selected from the group consisting of a bronze alloy having about 20–30 weight percent tin and 70–80 weight percent copper, and a copper/silver alloy having about 25–30 weight percent copper and about 70–75 weight percent silver.

12. The abrasive tool as set forth in claim 11, wherein said copper/silver alloy comprises approximately 28 weight percent copper, about 72 weight percent silver and further comprises about 4–6 weight percent titanium.

13. The abrasive tool as set forth in claim 10, wherein said nickel alloy comprises a Ni/Cr alloy having about 80–85 weight percent nickel, about 5–10 weight percent chromium and about 5–15 weight percent of a combination of boron, silicon and iron.

14. The abrasive tool as set forth in claim 13, wherein said Ni/Cr alloy comprises about 83 weight percent nickel, about 7 weight percent chromium, about 3.1 weight percent boron, about 4.5 weight percent silicon and about 3.0 weight percent iron.

15. The abrasive tool as set forth in claim 10, wherein said metal bond comprises an active braze.

16. The abrasive tool as set forth in claim 15, wherein said active braze comprises an active metal selected from the group consisting of titanium, zirconium, indium and combinations thereof.

17. The abrasive tool as set forth in claim 16, wherein said active braze comprises titanium and further comprises copper and tin.

18. The abrasive tool as set forth in claim 17, wherein said active braze comprises 70.6% Cu, 21.1% Sn, 8.3% $TiH_2$ by weight.

19. A method of fabricating an abrasive tool comprising the steps of:

(a) providing a core having at least one cutting face;

(b) knurling said at least one cutting face to provide a uniform texture of projections having uniform height;

(c) providing a single layer of abrasive grain having grain sizes smaller than said uniform height; and (d) brazing said single layer of abrasive grain onto said at least one cutting face at 600–900° C. in a non-oxidizing atmosphere.

20. The method as set forth in claim 19, wherein said single layer of abrasive grain comprises diamond, synthetic diamond, cubic boron nitride or mixtures thereof.

21. The method as set forth in claim 19, wherein said knurling step (b) comprises knurling a plurality of parallel grooves.

22. The method as set forth in claim 19, wherein said knurling step (b) comprises knurling a plurality of cross-hatched grooves.

23. The method as set forth in claim 19, wherein in said knurling step (b), the uniform texture of projections define an array of recesses, wherein said recesses have a larger size than a grit size of the grain.

* * * * *